(12) United States Patent
Yeh

(10) Patent No.: US 6,449,144 B1
(45) Date of Patent: Sep. 10, 2002

(54) NOTEBOOK COMPUTER FRICTION HINGE

(75) Inventor: Shih-Ping Yeh, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 09/921,592

(22) Filed: Aug. 6, 2001

(30) Foreign Application Priority Data

Aug. 18, 2000 (TW) ...................................... 89214389 U

(51) Int. Cl.⁷ ................................................. H05K 7/16
(52) U.S. Cl. ....................... 361/681; 361/682; 361/683; 439/136; 439/137; 439/164; 403/326; D14/100; D14/106; D14/114.1
(58) Field of Search ................................. 361/681, 682, 361/683; 439/136, 137, 164; 16/257, 258, 259; 403/78, 79, 325, 326, 327; D14/100, 106, 114.1

(56) References Cited

U.S. PATENT DOCUMENTS

| | | | | |
|---|---|---|---|---|
| 5,796,576 A | * | 8/1998 | Kim | 361/681 |
| 5,799,371 A | * | 9/1998 | Lin | 16/330 |
| D432,133 S | * | 10/2000 | Oross | D14/439 |
| 6,169,582 B1 | * | 1/2001 | Lee | 348/552 |
| 6,226,177 B1 | * | 5/2001 | Rude et al. | 361/687 |
| 6,301,748 B1 | * | 10/2001 | Su-Man | 16/342 |
| 6,321,416 B1 | * | 11/2001 | Lu | 16/374 |
| 6,373,689 B1 | * | 4/2002 | Yim | 361/681 |

* cited by examiner

Primary Examiner—Darren Schuberg
Assistant Examiner—David Foster
(74) Attorney, Agent, or Firm—Rabin & Berdo, P.C.

(57) ABSTRACT

A friction hinge for a notebook computer having a base and a liquid crystal display (LCD) is provided. The hinge comprises a pair of sleeves each having one end mounted to the base of the notebook computer and the other end pivotal relative to the sleeve, and a bracket member mounted to the LCD, each end of the bracket member fixed to the other end of each sleeve. This can greatly enhance the structural strength for preventing the LCD from deforming or damaging after long time of holding the notebook computer.

6 Claims, 4 Drawing Sheets

NOTEBOOK COMPUTER FRICTION HINGE

CROSS-REFERENCE TO RELATED APPLICATION

This application claims the priority benefit of Taiwan application serial no. 89214389, filed on Aug. 18, 2000.

BACKGROUND OF THE INVENTION

1. Field of Invention

The present invention relates to torque-producing friction hinges and more particularly to a friction hinge of the notebook computer with enhanced structural strength.

2. Description of Related Art

A conventional notebook computer is shown in FIGS. 3A and 3B wherein a hinge 33 is mounted between the base 31 of notebook computer and the liquid crystal display (LCD) 32. In a use position, LCD 32 is pulled up to be supported at one of various desired angles relative to the base 31 of notebook computer (FIG. 3A). User may close LCD 32 onto the base 31 of notebook computer after use. This is a storage position of notebook computer (FIG. 3B). Typically, an area indicated by numeral 34 is covered by the hand of user while holding the notebook computer. Hence, a considerable amount of force is applied on such area 34 and thus the LCD 32. As a result, LCD 32 may be deformed or even damaged by the relatively unreliable hinge 33. Thus improvements exist.

SUMMARY OF THE INVENTION

It is an object of the present invention to provide a friction hinge for the notebook computer so that the problem of liquid crystal display (LCD) of notebook computer being deformed or damaged after long time of holding the notebook computer as experienced in prior art is substantially eliminated.

It is another object of the present invention to provide a friction hinge for the notebook computer so that it is possible to pivot and hold the LCD at one of various desired angles relative to the base of notebook computer.

It is still another object of the present invention to provide a friction hinge for the notebook computer wherein the contact area between the hinge and the LCD of notebook computer is increased for reducing force required to pivot the LCD at a desired angle relative to the base of notebook computer, thereby prolonging the useful life of the hinge and the LCD.

To achieve the above and other objects, the present invention provides a friction hinge for the notebook computer having a base and a liquid crystal display (LCD). The friction hinge includes a pair of sleeves each having one end mounted to the base of the notebook computer and the other end pivotal relative to the sleeve; and a bracket member mounted to the LCD, each end of the bracket member fixed to the other end of each sleeve.

The above and other objects, features and advantages of the present invention will become apparent from the following detailed description taken with the accompanying drawings.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
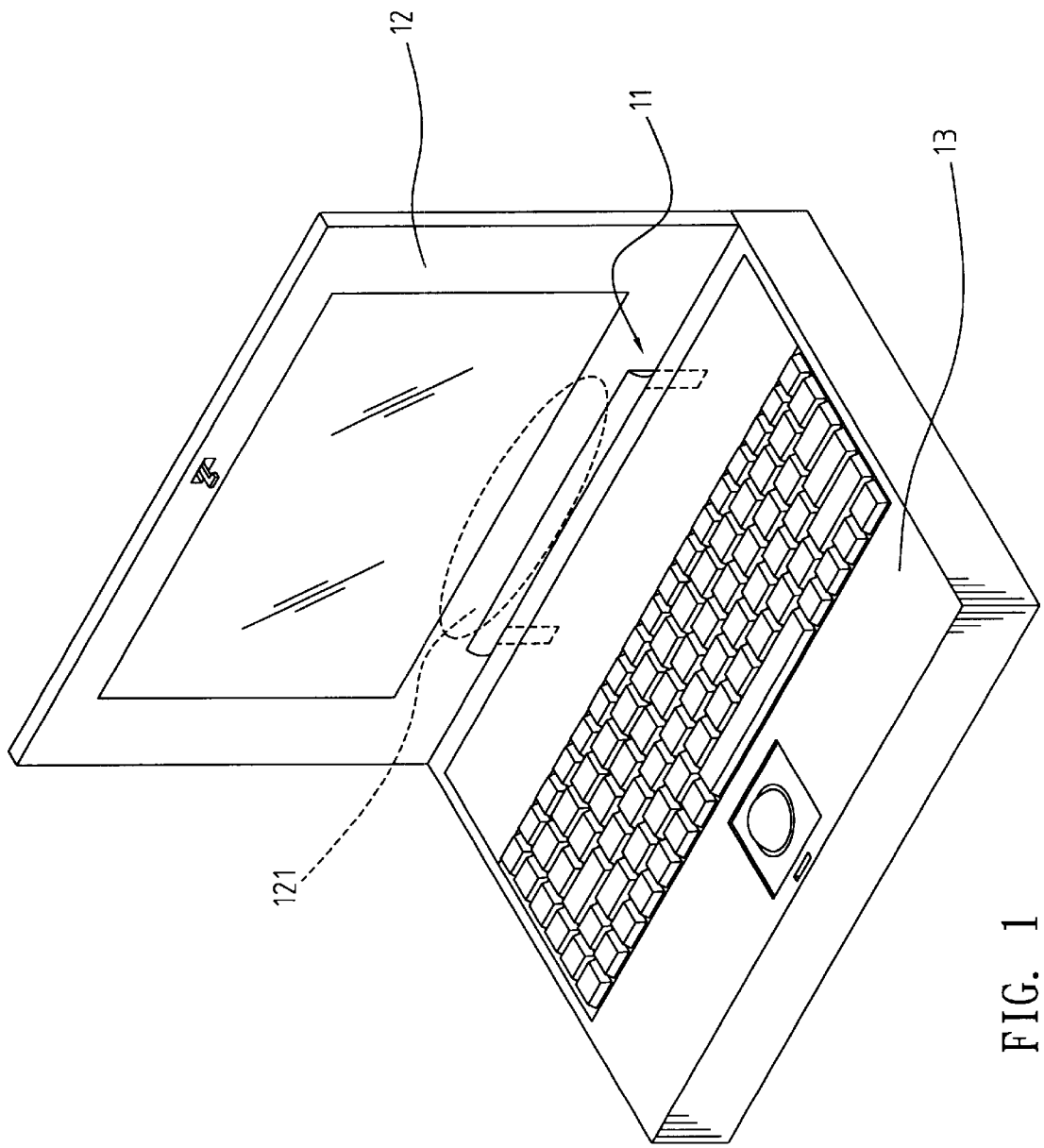
FIG. 1 is a perspective view of a notebook computer incorporating a hinge according to the invention where notebook computer is open.

Referring to FIG. 1, there is shown a notebook computer incorporating an n-shaped friction hinge 11 constructed in accordance with the invention. Hinge 11 is mounted between the base 13 of notebook computer and the liquid crystal display (LCD) 12. Most parts of hinge 11 are at an area indicated by numeral 121, i.e., the central portion of an area between LCD 12 and the edge of the base 13 of notebook computer adjacent LCD.

Figure 2:
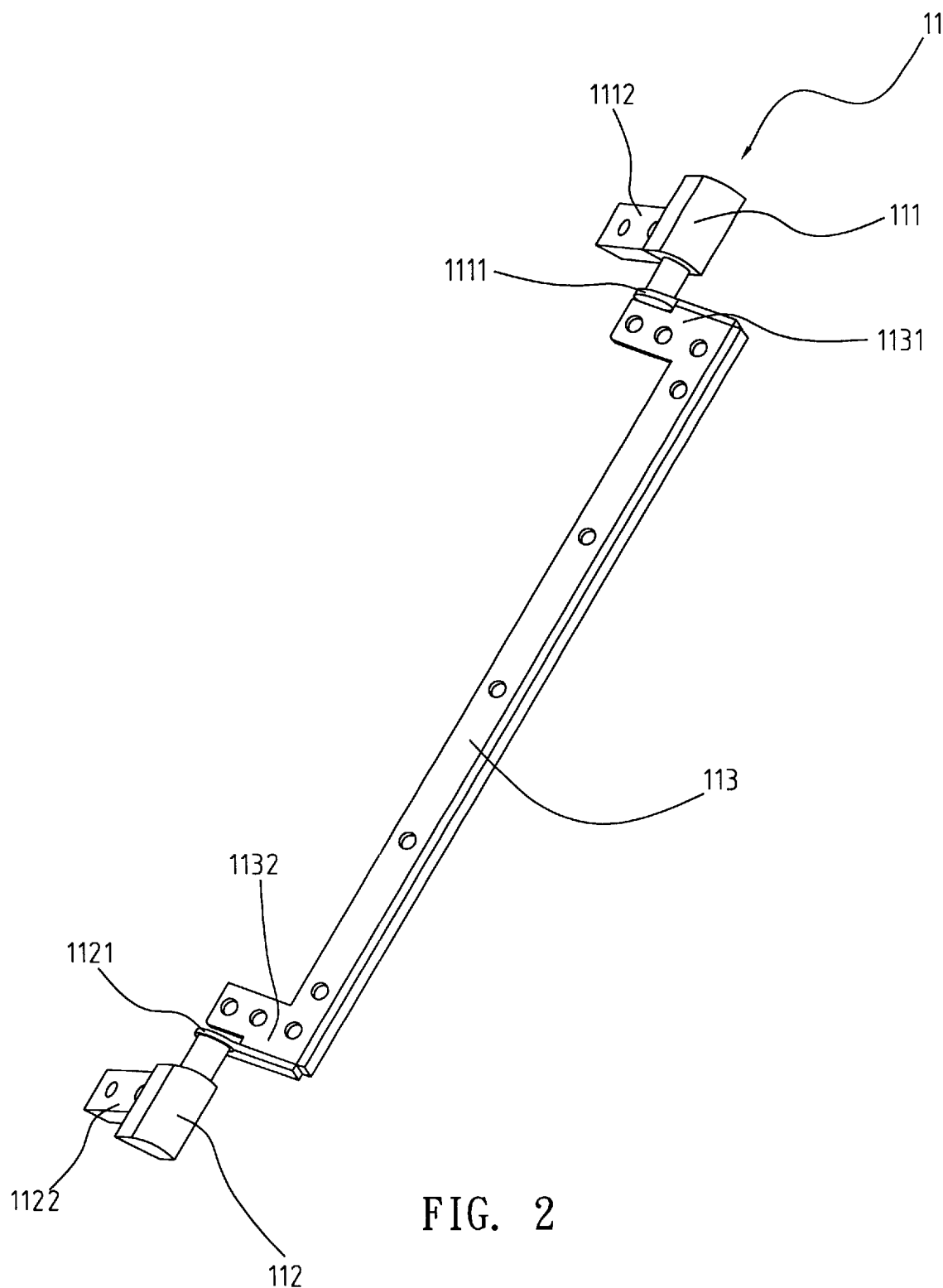
FIG. 2 is a perspective view of the FIG. 1 hinge.
Figure 3A:
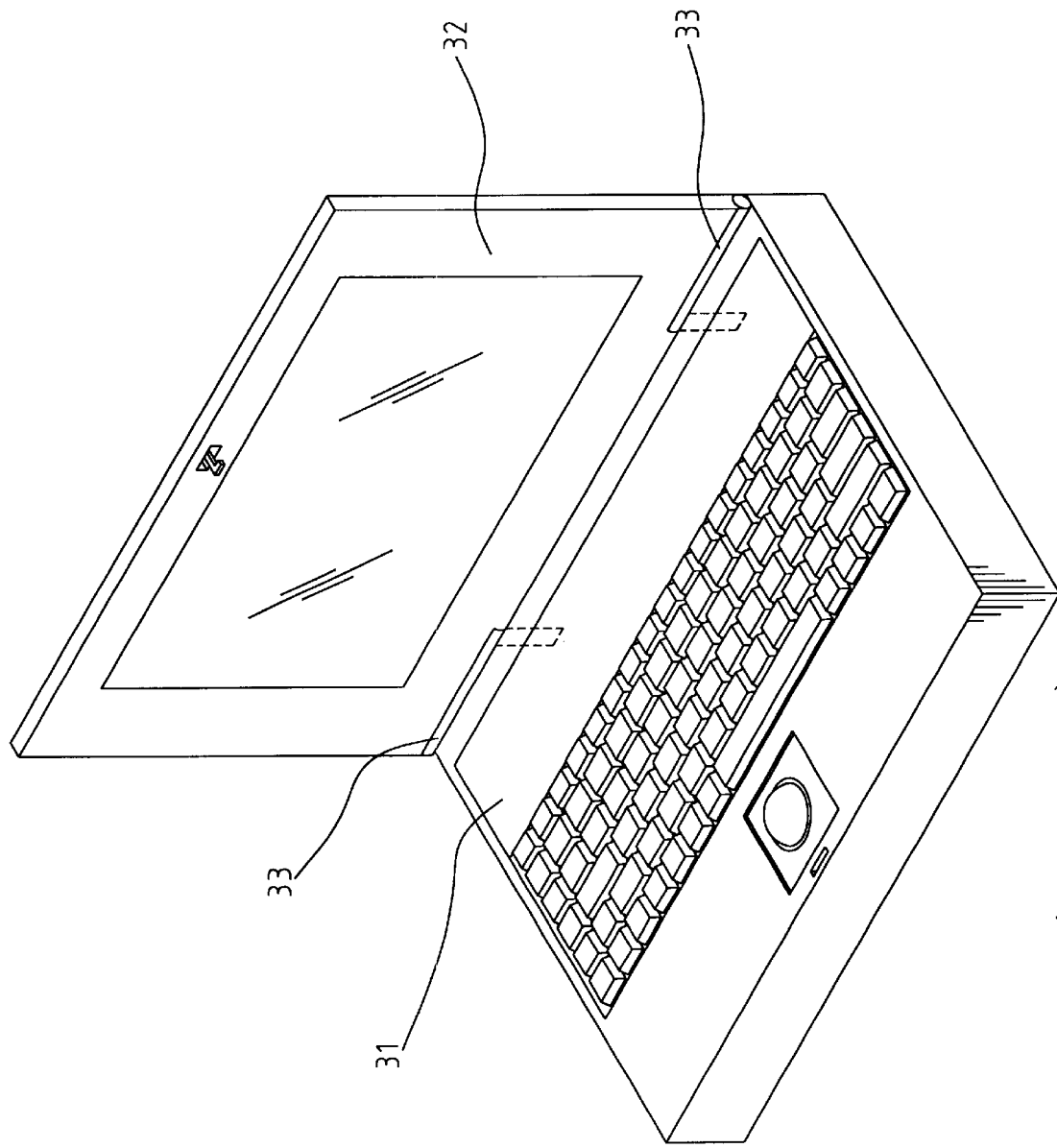
FIG. 3A is a perspective view of a conventional notebook computer open to reveal a hinge.
Figure 3B:
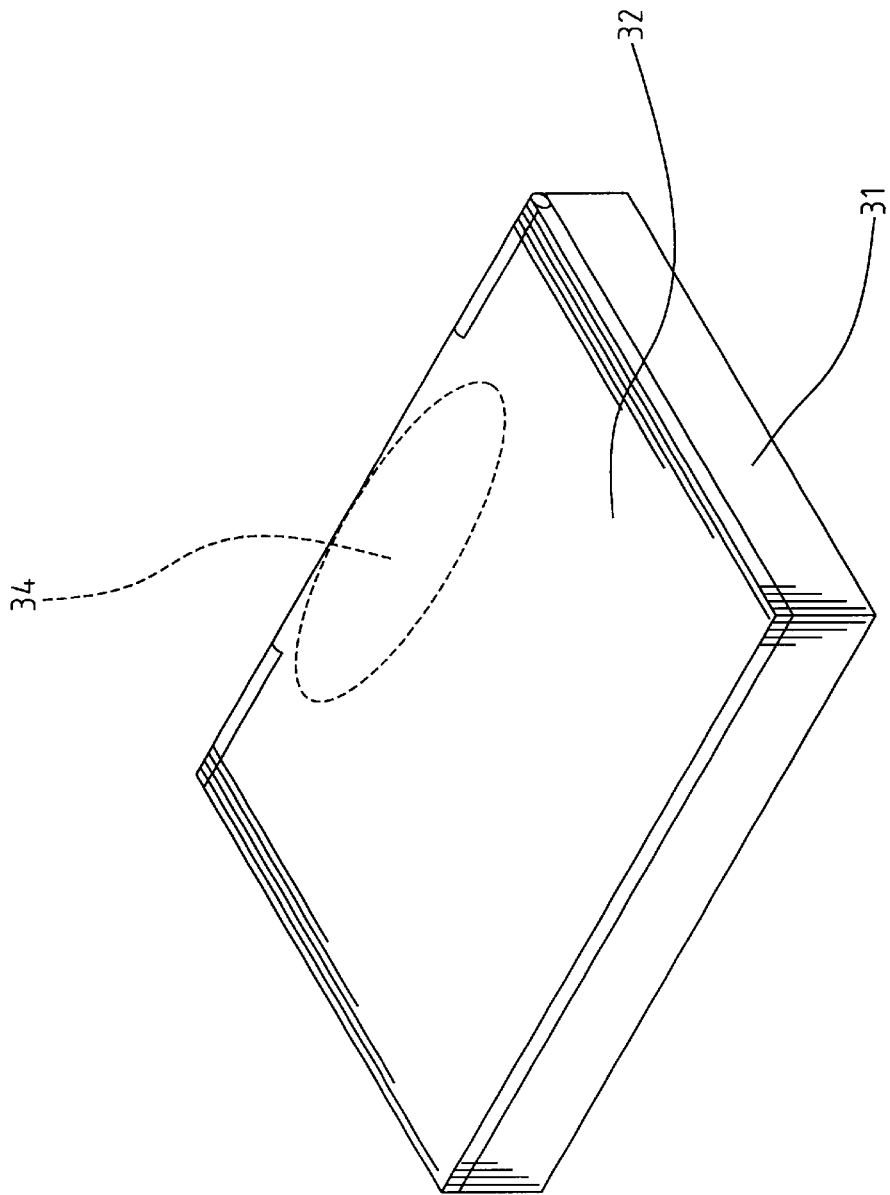
FIG. 3B is a view similar to FIG. 3A where notebook computer is closed.

Referring to FIG. 2, the n-shaped friction hinge 11 includes a pair of sleeves 111 and 112 each having a first end 1112 (or 1122) mounted to the base 13 of notebook computer and a second end 1111 (or 1121) pivotal relative to the sleeve 111 (or 112), and a bracket member 113 mounted to LCD 12. The bracket member 113 has two ends 1131 and 1132 fixed to the second ends 1111 and 1121 of sleeves 111 and 112 respectively. Preferably, the bracket member 113 has a length no less than one half of the transverse length of LCD 12.

Preferably, the bracket member 113 is formed of hard metal material for preventing the LCD 12 from deforming or being damaged after being held for a long time. Further, since the structural strength of the notebook computer is enhanced, the pivoting operation of notebook computer becomes more smooth and the holding of LCD 12 by the hinge 11 is more reliable. Furthermore, by implementing the friction hinge 11, it is possible to increase the contact area between the hinge 11 and the LCD 12 of notebook computer for reducing the force required to pivot the LCD 12 at a desired angle relative to the base 13 of notebook computer, thereby prolonging the useful life of the hinge 11 and the LCD 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A friction hinge for a notebook computer having a base and a liquid crystal display (LCD), said friction hinge comprising:

a pair of sleeves, each having a first end mountable to the base of the notebook computer, and each having a second end that is pivotal; and a single bracket member mountable to the LCD, said bracket member having a first end connectable to the second end of one of said sleeves, and a second end connectable to the second end of another one of said sleeves, wherein when said bracket member is mounted to the LCD, said bracket member reinforces the notebook computer in a region of the LCD to prevent the LCD from being deformed or damaged.

2. The friction hinge of claim 1, wherein said bracket member has a length no less than one half of a transverse length of the LCD.

3. The friction hinge of claim 1, wherein said bracket member is formed of metal material.

4. In combination, a notebook computer having a base and a liquid crystal display (LCD), and a friction hinge connecting said base to said LCD, said friction hinge comprising:

a pair of sleeves, each having a first end mounted to said base, and each having a second end that is pivotal; and a single bracket member mounted to said LCD, said bracket member having a first end connected to the second end of one of said sleeves, and a second end connected to the second end of another one of said sleeves, wherein when said bracket member is mounted to said LCD, said bracket member reinforces said notebook computer in a region of said LCD to prevent said LCD from being deformed or damaged.

5. The combination of claim 4, wherein said bracket member has a length no less than one half of a transverse length of said LCD.

6. The combination of claim 4, wherein said bracket member is formed of metal material.

* * * * *